United States Patent [19]

Matsumoto et al.

[11] Patent Number: 5,745,722
[45] Date of Patent: Apr. 28, 1998

[54] APPARATUS FOR DECODING INSTRUCTION IMMEDIATE DATA TO PRODUCE A STRING HAVING A SINGLE BIT DIFFERENT FROM OTHER BIT THEREOF

[75] Inventors: Kenshi Matsumoto, Koshigaya; Yasuhito Koumura, Tokyo; Hiroki Miura, Warabi, all of Japan

[73] Assignee: Sanyo Electric Co., Ltd., Osaka, Japan

[21] Appl. No.: 661,084

[22] Filed: Jun. 10, 1996

[30] Foreign Application Priority Data

Jun. 15, 1995 [JP] Japan ................................ 7-148511

[51] Int. Cl.$^6$ .............................................. G06F 9/308
[52] U.S. Cl. .......................... 395/386; 395/381; 395/705; 341/51
[58] Field of Search ..................... 395/386, 705, 395/384, 381; 341/51

[56] References Cited

U.S. PATENT DOCUMENTS

| | | | |
|---|---|---|---|
| 5,072,372 | 12/1991 | Schmidt | 395/381 |
| 5,201,056 | 4/1993 | Daniel et al. | 395/800 |
| 5,423,012 | 6/1995 | Sato et al. | 395/380 |
| 5,581,717 | 12/1996 | Boggs et al. | 395/384 |

OTHER PUBLICATIONS

"32 Bit RISC Single Chip Microcomputer V850 Family"; SUD-T-2288; NEC Corporation 1994, 1995; 1995 Apr. 21. *MN10200 Series*; "Micro Computer: Data Book: 1993.11"; Panasonic, pp. 151–159.

"NEC 32 Bit RISC Single Chip Microcomputer V850 Family"; SUD-T-2288; NEC Corporation 1994, 1995; 1995 Apr. 21 with partial translation.

*Matsushita Electronics Corporation MN10200 Series*; "Micro Computer: Data Book: 1993.11"; Panasonic; pp. 151–159 (partial translation only).

"NEC V810TM—32 Bit Microprocessor", IEU–789B; Sep. 1993, pp. 3, 4 and 75–78 with partial translation.

"NEC Microcomputer"; Apr. 1996; pp. 14–20 with partial translation.

*Primary Examiner*—Parshotam S. Lall
*Assistant Examiner*—Gautam R. Patel
*Attorney, Agent, or Firm*—Armstrong, Westerman, Hattori, McLeland & Naughton

[57] ABSTRACT

An instruction decoder decodes an instruction code, whereupon immediate data, if included, is searched to see whether it is encoded or not. After decoding, an operation code in the instruction code is informed to the execution unit. If the instruction code includes immediate data, the data is transmitted to a data decoder to be decoded according to a given rule. The decoded data is transmitted to the execution unit. Because the immediate data is reduced in size through encoding, the number of times instructions are fetched is accordingly reduced, which resultantly increases processing efficiency. Since an entire instruction code is also reduced in size, a wider variety of operations are instructed using the same instruction code format.

8 Claims, 3 Drawing Sheets

APPARATUS FOR DECODING INSTRUCTION IMMEDIATE DATA TO PRODUCE A STRING HAVING A SINGLE BIT DIFFERENT FROM OTHER BIT THEREOF

BACKGROUND OF THE INVENTION

1. Field of the Invention

The present invention relates to an apparatus for executing a program which contains immediate data, and a program conversion method for generating an instruction which the apparatus can carry out.

2. Description of the Prior Art

In this specification, "a program execution apparatus" means an apparatus which executes a program for processing data, the program having been converted into such a data format that allows the apparatus to execute the program (that is, an instruction expressed in a machine code). A micro processor is a typical example of such an apparatus. The apparatus is not necessarily composed of a single component.

"A program conversion method" means a method for converting a program into such a data format that allows the program execution apparatus to execute the program. Such a method is generally employed by a compiler which uses a high level language. In the following, programs before and after format conversion are both referred to as a program unless it will cause confusion.

A program execution apparatus reads a program from a memory for execution. Accompanying recent developments in electronic products causing them to have complex functions, the size of a program to be executed by such an apparatus has tended to increase, which often causes the cost of program memory hardware to be higher than that of a central processing unit (CPU). Thus, reduction of a program size has been urgently desired.

This is particularly a serious problem when such a program execution apparatus is expected to have a high performance. If a micro processor is taken as an example, the initially developed 8-bit processor has recently been losing its position in the mainstream and is gradually being replaced by 16 or 32 bit processors. As the tendency towards greater bit size becomes more established, the size of a basic instruction code also becomes larger, which resultantly causes an increase in program size.

In order to solve the above problem, a method has been suggested for reducing the basic size of an instruction code to be smaller than the basic size of data to be processed. For instance, Matsushita Electric, Industry Corp. produces a 16-bit micro processor MN10200 which employs an 8-bit code for a basic instruction. Nihon Electric, Corp. produces a 32-bit micro processor V850 which employs a 16-bit code for a basic instruction.

This approach, however, still has a problem with an immediate instruction which is an instruction having immediate data therein. That is, since immediate data which is contained in an immediate instruction is generally large, a single unit of basic instruction code is not sufficient to include such large immediate data. In order to prepare an immediate instruction which contains 8-bit immediate data, the foregoing MN10200 requires an immediate instruction code which is larger than 8 bits, for example 16 bits. When the immediate data is 16 bits, an immediate instruction code must be larger. Since this micro processor is a 16-bit type, the processor would naturally process 16-bit immediate data. The above described situation where a longer immediate instruction code is required in order to contain long immediate data is true with a V850 32-bit micro processor. It should be noted that this situation often exists for other micro processors.

SUMMARY OF THE INVENTION

The present invention has been conceived in order to overcome the above problems, and therefore aims to provide a program conversion method for encoding immediate data at the time of converting a program into a desired program format, thereby reducing the sizes of an instruction code and the program. The present invention further provides a program execution apparatus which decodes the thus encoded immediate data for executing a program.

A program execution apparatus of the present invention comprises: a fetch section capable of sequentially fetching instructions, including an immediate instruction; a decoding section capable of decoding fetched instructions; and an execution section capable of executing decoded instructions, wherein the decoding section includes a judgement section capable of judging whether a fetched immediate instruction includes immediate data which has been encoded, the program execution apparatus further comprising a data decoding section capable of decoding immediate data which has been encoded.

According to the program execution apparatus of the present invention, instructions including immediate instructions are sequentially fetched and decoded so that the execution section carries out the fetched instruction. When a fetched immediate instruction includes immediate data which has been encoded according to a given rule, the encoded immediate data is first decoded when the instruction is decoded. Whether the immediate data is encoded or not is judged by referring to a specific bit within the immediate instruction.

Since the present program execution apparatus can deal with encoded and thereby shortened immediate data, it is possible to reduce the size of a program to be processed by the apparatus and the number of instruction codes, while improving the performance of the apparatus.

According to one aspect of the invention, the data decoding section includes an expanding section capable of expanding encoded immediate data into a binary data string according to a value of the encoded immediate data.

For decoding, encoded immediate data is expanded into a binary string such that, with the value of the encoded immediate data is N, only bit (N+1) of the expanded data is set differently from all other bits of the expanded data.

According to another aspect of the present invention, the immediate instruction includes a bit which indicates if a subtraction operation is necessary for contained immediate data, wherein the data decoding section refers to the bit and, when the bit indicates that the subtraction operation is necessary, subtracts one from data represented by the binary string, thereby generating another binary string.

According to another aspect of the present invention, the data decoding section further includes a memory section capable of storing correspondence of immediate data before decoding and immediate data resulting from decoding, and a conversion section capable of converting data according to the correspondence stored in the memory section.

In this case, a circuit can be made of a simple structure, causing only a small conversion delay.

A program conversion method of the present invention comprises a step of encoding predetermined immediate data of all immediate data in the program before conversion.

Through this step, predetermined immediate data of all immediate data in the program are encoded so as to be converted later, wherein frequent or pre-specified immediate data, or data items having a predetermined numerical characteristic are encoded.

If frequent and/or pre-specified immediate data are encoded, it is possible to further reduce the size of an entire instruction code. Also, if immediate data which has predetermined numerical characteristic is encoded, it is possible to carry out the encoding operation more easily and efficiently.

According to another aspect of the present invention, when the program includes an operation for manipulating the (N)th bit of data, the program conversion method further comprises steps of obtaining (N−1) so as to use (N−1) being encoded immediate data; selecting a basic operation which allows the intended bit manipulation; replacing the bit manipulation operation with the basic operation which has (N−1) as immediate data; and executing a conversion operation.

Through these steps, (N−1) is first obtained and used as encoded immediate data. A basic operation which allows the intended manipulation is then selected, so that the bit manipulation operation is replaced by the selected basic operation having (N−1) as immediate data, before conversion.

With this arrangement, since an instruction for a bit manipulation operation can be expressed in the form of a basic operation plus encoded data, it is possible to reduce the number of instruction codes, thereby in turn reducing the size of an instruction code and thus an entire program.

BRIEF DESCRIPTION OF THE DRAWINGS

The above and other objects, features and advantages will be apparent from the following description of the preferred embodiment taken in conjunction with the accompanying drawings wherein.

DESCRIPTION OF THE PREFERRED EMBODIMENTS

In the following, preferred embodiments of the present invention will be described with reference to the accompanying drawings.
Embodiment 1

Figure 1:
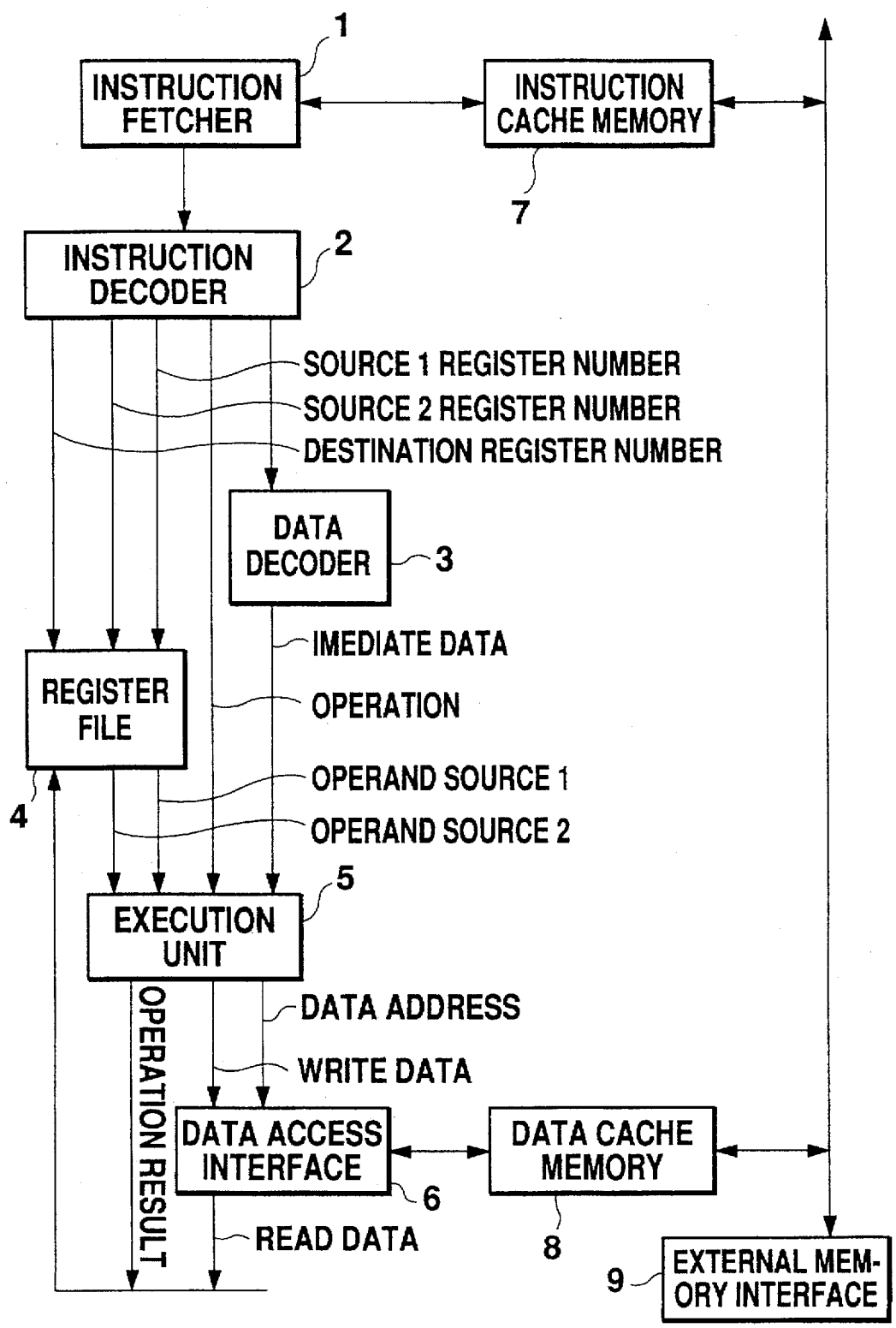
FIG. 1 shows the structure of a program execution apparatus according to a first embodiment of the present invention.

FIG. 1 shows the structure of a preferred embodiment of a program execution apparatus. The apparatus is characterized by a data decoder 3 (described later). When the apparatus receives encoded immediate data (hereinafter referred to as encoded data), the data decoder 3 decodes the encoded data back into the original data. Here, immediate data which is not encoded, that is, which does not need to be decoded, is hereinafter referred to as "not-encoded data."

Figure 2:
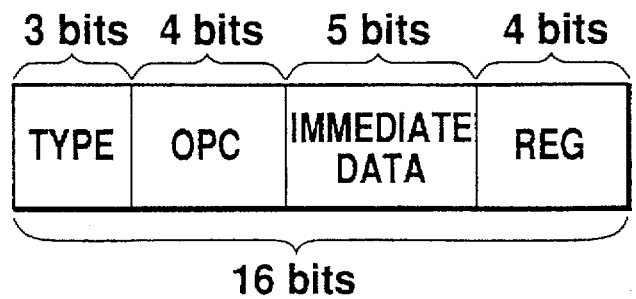
FIG. 2 shows a format of a basic instruction code used in the program execution apparatus of the first embodiment.

FIG. 2 shows a format of a basic instruction code used in the present apparatus. In this embodiment, the program execution apparatus comprises a 32-bit micro processor, whose basic instruction code is 16-bits in size.

As is shown in the drawing, the 16-bit instruction code consists of the following fields:

(1) type field (three bits)

A type field indicates the type of instruction, such as whether it is an immediate instruction or not, and, if it is, whether the accompanying immediate data is encoded or not. One of the three bits is used to indicate whether the data is encoded or not.

(2) "opc" field (operation code) (four bits)

The opc field indicates the kind of operation, such as an "and," "sub," or "not" operation. The opc field may be constituted of seven bits, being combined with the type field.

(3) immediate data field (five bits)

The immediate data field contains immediate data. As for encoded data, the original immediate data, or the immediate data before encoding, is fully specified by using these five bits, wherein the original immediate data which can be specified must be restricted to $2^5=32$ variations. As for not-encoded data, there may be a case where six or more bits are required to specify such data. In this case, that immediate instruction exceptionally consists of two or more words.

(4) "reg" field (four bits)

The reg field indicates (a) register number(s) to be used in the operation, wherein the registers which can be designated are restricted to 16 variations. Some operations may use two source registers (sources 1 and 2) and one destination register, as is exemplified in FIG. 1. The operation in this embodiment uses only one destination register which may be a source register at the same time. In the process where an operation is executed between decoded data and data within the register and the result of the operation is logged in the same register, the register acts as both source and destination registers. In the following, registers are referred to as r0, r1 or the like.

Referring to the code format in FIG. 2, the structure of a program execution apparatus in FIG. 1 will next be described.

An instruction code is read, via an instruction cache memory 7, into an instruction fetcher 1. The instruction code is further transmitted to an instruction decoder 2 to be decoded therein. In the process of decoding the supplied instruction code, the instruction decoder 2 refers to the type field of the code so as to see whether the code includes immediate data or not. When it does, the decoder 2 further detects whether the immediate data is encoded or not also with reference to the type field.

After the instruction code is decoded, the operation designated by the opc field is informed to an execution unit 5. Further, if the reg field contains an effective register number, the number is also informed to a register file 4, so that the execution unit 5 reads/writes data with respect to the designated register.

When the instruction decoder 2 detects that the instruction code contains immediate data, the immediate data is transmitted to a data decoder 3. When the immediate data is encoded, the data decoder 3 decodes the data according to a given rule (described later), thereby generating decoded immediate data (hereinafter referred to as decoded data). The decoded data is then transmitted to the execution unit 5 to be processed. When the supplied immediate data is not encoded, the data decoder 3 sends the data intact to the execution unit 5.

Upon receipt of the immediate data, the execution unit 5 executes a designated operation on the data, and generally outputs the result of the operation, write data, data address or the like. The write data is transmitted, via a data access interface 6, to a data cache memory 8, and stored therein, so that the data may be subsequently transmitted to the outside via an external memory interface, as requested. When data are read from the data cache memory 8, it is transmitted via the data access interface 6 to the register file 4.

In this embodiment, the result of an operation or decoded data are only written in a destination register, and are not transmitted to the outside.

Decoding Rules

In the following, some examples of decoding rules will be described, according to which the data decoder 3 decodes supplied encoded data. Because the decoding rules naturally depend on encoding rules, which have not been described, the following explanation will be complemented later in the description of a second embodiment.

[Rule 1]

Encoded data N represents the (N+1)th digit of decoded data M

Encoded data N is expressed in binary form in the five-bit immediate data field. Since it is possible to discriminate 32 ($2^5$) variations using five digits, N can be a number in the range between 0 to 31. Here, the correspondence between encoded data N (in decimal) and decoded data M (in binary) is defined as follows:

N=0: M=0000 0000 0000 0000 0000 0000 0000 0001 (=1h)
N=1: M=0000 0000 0000 0000 0000 0000 0000 0010 (=2h)
N=2: M=0000 0000 0000 0000 0000 0000 0000 0100 (=4h)
N=31: M=1000 0000 0000 0000 0000 0000 0000 0000 (=80000000h)

In other words, the data decoder 3 decodes encoded data N into decoded data M, which consists of 32 binary bits, such that only the (N)th bit of the decoded data M is 1. When data N is decoded under the above rule, the expression $M=2^N$ is held between data N and M. This decoding operation can be achieved by means of hardware within the data decoder 3. This hardware may be constituted as a constant generator which outputs a predetermined number M for a specified number N. Because such a conversion from data N to M takes only a matter of nano-seconds, it is possible to constitute a circuit within the data decoder 3 without increasing the number of machine cycles to execute the instruction.

[Rule 2]

After decoding under Rule 1, decoded data M is subtracted

As described above, the immediate data field consists of five bits. Here, out of these five bits, the most significant bit (MSB), for example, is used to indicate whether it is necessary to execute a subtraction operation. In this embodiment, when the MSB presents 1 (MSB=1), the decoded data M is subjected to an subtraction operation. With the MSB being used for a subtraction indication, the value of N is specified in the range from 0 to 15 by using the remaining four bits.

(1) MSB=0

Decoded data M is not subtracted. Encoded data N corresponds to decoded data M as follows:

N=1: M=0000 0000 0000 0001 (=1h)
N=1: M=0000 0000 0000 0010 (=2h)
N=2: M=0000 0000 0000 0100 (=4h)
N=15: M=1000 0000 0000 0000 (=8000h)

As is apparent from the above, encoded data N is decoded into M according to the same method as Rule 1 except for the number of digits.

(2) MSB=1

The decoded data M which is obtained with the MSB being 0 is decremented by one. Thus, all bits equal to and higher than the (N+1)th bit of the decoded data M are turned into 0, while all the other bits are turned into 1, as shown in the following.

N=0: M=0000 0000 0000 0000 (=0h)
N=1: M=0000 0000 0000 0001 (=1h)
N=2: M=0000 0000 0000 0011 (=3h)
N=15: M=0111 1111 1111 1111 (=7FFFh)

[Rule 3]

Allocate one desired decoded data M to one encoded data N When a program uses the same immediate data frequently, such immediate data are encoded. For instance, if the immediate data M=1234h and M=5678h are frequently used in some program, these numbers are encoded as N=0 and N=1, respectively, according to a program conversion method of the present invention (described in the following embodiment 2). The data decoder 3 is to have a table which shows a correspondence between numbers N and M. The decoder 3 refers to the table and searches for a number M corresponding to a supplied data N.

Whichever rule in the above is applied for decoding, encoding and decoding sides must first decide the rule to be applied. These rules may be fixedly applied between both sides. Alternatively, the opc field may specify a rule to be applied to decode the immediate data within the same instruction code. As a further alternative, a system register of the program execution apparatus may pre-store a plurality of rules so that a suitable one may be selected at the time of decoding.

As can easily be imagined, if all the bits of decoded data M are inverted so as to be used as independent decoded data, the present invention can apply to a wider range. For this purpose, the execution unit 5 is provided with a "not" operation function for inverting all the bits of decoded data. The "not" operation is regarded as one of the instructions, and specified by an opc field. When the "not" operation is executed for the decoded data M which has been obtained under Rule 1, the execution unit 5 inverts all the bits thereof and encoded data N are decoded as follows:

N=0: M=1111 1111 1111 1111 1111 1111 1111 1110 (=FFFFFFFEh)
N=1: M=1111 1111 1111 1111 1111 1111 1111 1101 (=FFFFFFFDh)
N=2: M=1111 1111 1111 1111 1111 1111 1111 1011 (=FFFFFFFBh)
N=31: M=0111 1111 1111 1111 1111 1111 1111 1111 (=7FFFFFFFh)

Inverted decoded data is stored in a destination register as the result of the "not" operation.

Shortening of instruction code

The advantage of the present invention will now be explained in more detail. Assume that, for example, a program contains a line of ld r0, 0X80000000 (to load 80000000h into register r0)

By applying Rule 1 in a backward manner to this line, the immediate data "80000000h" is first encoded into "N=31 (1Fh)" according to the program conversion method, and then converted into an instruction code. Provided the original immediate data "80000000h" is directly converted into an instruction code, it will require 32 bits to describe the data, whereas the encoded data "31" requires only five bits. As a result, a conventional three-word instruction can be reduced into a one-word instruction. For executing this instruction, the program execution apparatus of the present invention first judges whether the five-bit immediate data is encoded or not, referring to the type field, and, when it is, decodes the encoded data back into the original 32-bit binary data according to Rule 1, before proceeding to execution of the operation.

Thus, encoding and decoding immediate data reduces not only the size of an instruction code, but also the number of times instructions are fetched. As a result, the performance of the apparatus is improved. These advantages of the present invention are particularly significant when immediate data in a loop routine is encoded.

According to this embodiment, the number of immediate data which can be encoded is determined by the number of bits of the immediate data field of the instruction code. More specifically, a five-bit immediate data field can discriminate only 32 variations of encoded data. In spite of such a small number, the foregoing encoding and decoding arrangement will still significantly contribute to the reduction of the size of an instruction code and thus an entire program, due to the following general rules:

(1) a considerable number of immediate data items included in a program coincide with any of the above decoded data, such as ones expressed as $2^N$, and (2) as to bit manipulation operations, the above decoded data include almost all immediate data used in such operations.

It should be further noted that, because of the reason (2), a side effect is produced of reducing the number of instructions. As an example, when detecting (extracting) the bit 6 (the seventh bit) of the register r0, conventionally, an operation command unique to a bit manipulation operation (hereinafter referred to as a unique operation), such as tst r0, 7, has been used. (Besides "tst," a "set" command may also be used in some micro processors). Suppose that these unique operations are executed through general logic operations, such as an "or" operation, (hereinafter referred to as a general operation), an instruction code for such a logic operation must contain a long immediate data item, such as and r3, 0×0040" (Expression 1).

As a result, the size of the entire instruction code is increased without the unique operations.

Figure 3A:
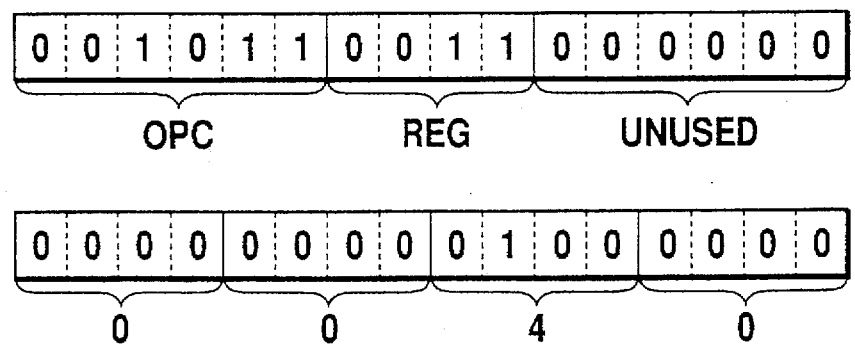
FIG. 3(a) shows a conventional unencoded instruction code which embodies expression 1.
Figure 3B:
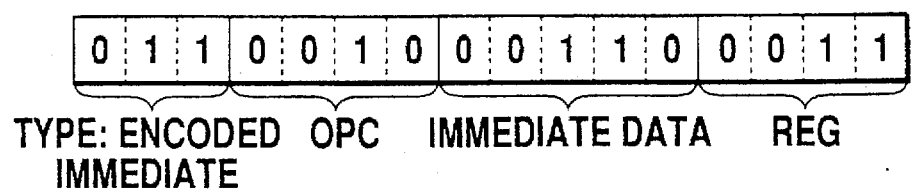
FIG. 3(b) showing an encoded instruction code which embodies expression 1 according to the present invention.

Here, according to the present invention, the immediate data "0040h" can be encoded as N=6 on the basis of the Expression
M=40h=64=$2^6$ FIGS. 3(a) and 3(b) show an instruction code which embodies the expression 1, FIG. 3(a) being a conventional instruction code which is not encoded, and FIG. 3(b) being an encoded instruction code according to the present invention. As is apparent from the drawings, the conventional instruction code needs two words, whereas the present instruction code needs only one word. Even 32-bit immediate data needs only one word to be specified, when it is encoded according to the present invention.

In short, since all the bit manipulation operations can be executed through general operations, unique operations are hardly necessary. Elimination of unique operations reduces the number of instructions. Reduction of the number of instructions makes the opc field smaller, which in turn allows the immediate data field to become larger, using redundant bits of the opt field. Finally, the size of the entire instruction code can be further decreased.

In view of the above, for the program execution apparatus of the present embodiment "and", "or", "xor", and "mask" operations are available as a general operation.:
(1) "and" operation To compute logical AND of the data represented by decoded or expanded binary digit string, and another operand data designated by the immediate instruction.
(2) "or" operation To compute logical OR, similarly to the above.
(3) "xor" operation To compute logical exclusive OR, similarly to the above.
(4) "mask" operation To compute logical AND of the data represented by expanded binary digit string with all bits inverted and another operand data designated by the immediate instruction.

These operations allow easy extraction, setting, inverting and resetting of a desired bit of data. In other words, the present embodiment is characterized by the fact that these operations having immediate data can be expressed in one basic instruction code size, that is, one word.

It should be noted that the advantage of the foregoing first embodiment is more significant when a basic processing data size is larger. More specifically, an immediate data field, even for a 32-bit micro processor, needs only five or six bits in order to specify encoded data. The difference in the number of bits between an immediate data field and the basic processing data is regarded as the reduction effect achieved by the present embodiment.

In the above embodiment, the opc and immediate data fields are defined as consisting of four and five bits, respectively, for convenience of the description. However, they may consist of a different number of bits, such as the former consisting of three bits, the latter consisting of six bits. In particular, a 6-bit immediate data field is preferable for a 32-bit micro processor because the 6-bit field will make it possible to present encoded data which is to be decoded into 32-bit data even when Rule 2 is applied for decoding.

Embodiment 2

A program conversion method of the present invention will next be described.

Figure 4:
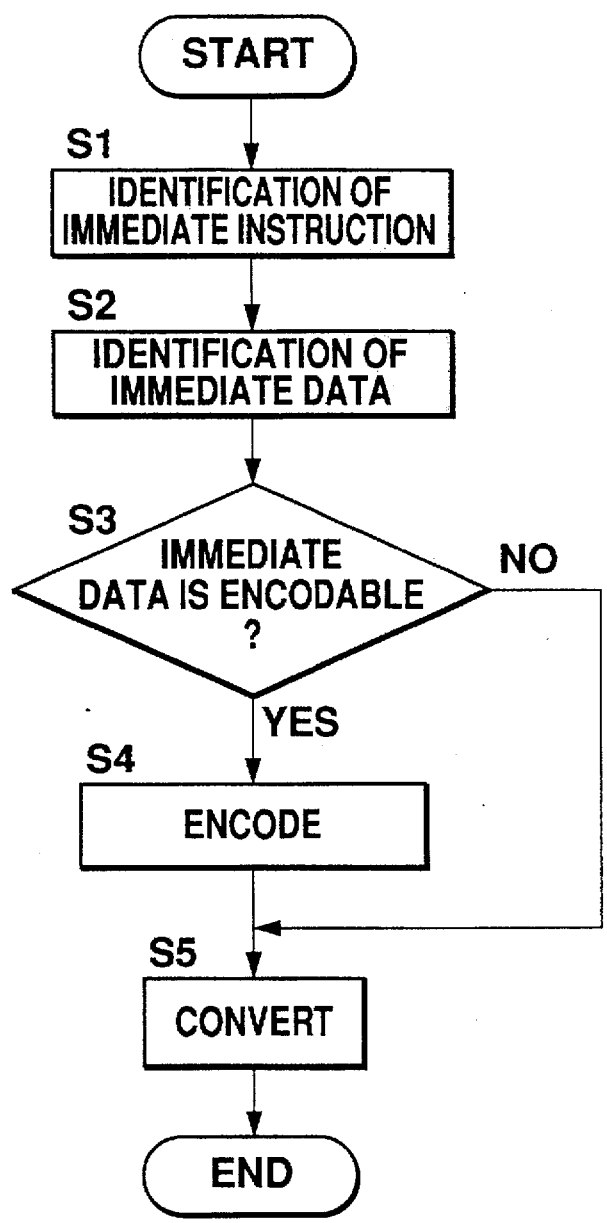
FIG. 4 is a flow chart which shows the procedure of a program conversion method according to a second embodiment of the present invention.

FIG. 4 is a flow chart which shows the procedure of a program conversion method according to a second embodiment of the present invention. As is shown in the drawing, the present method includes the following steps for program conversion. A source program is generally described in a high level language, while a program after conversion is described in a machine language which is executed by a micro processor. The program conversion method of this embodiment is mainly used by a compiler.

(S1) identification of an immediate instruction

When converting an input program sequentially, it is first judged whether an instruction to be converted within the program is an immediate instruction or not. For instance, if a program contains a line "and r0, 0×80000000," the line is judged as an immediate instruction.

(S2) identification of immediate data

If the instruction to be converted is an immediate instruction, immediate data within the instruction is identified. In the above example, "80000000h" is identified as immediate data.

(S3) judgement as to encodability

It is judged whether the identified immediate data is encodable or not. As a criteria of judgement, immediate data which corresponds to any of the numbers Ms introduced in the foregoing description about "Decoding Rules" in the first embodiment are judged as encodable. More specifically, immediate data which meets the following conditions are judged as encodable.

(1) presenting a predetermined numerical characteristic, such as is defined under Rules 1 and 2.

(2) frequently used in a program, as defined under Rule 3.

In the above example, "80000000h" is judged as encodable according to Rule 1. In order to judge the frequency, a provisional step may be provided in which an entire program is scanned prior to the conversion. Alternatively, every immediate data item which sequentially appears from the beginning of the program may be determined as frequent immediate data in the appearing sequence.

In addition to the above, other conditions, such as the following, may be considered.

(3) specified by a user.

A user can specify some immediate data as encodable by so coding them (such as by giving an identifier to them) during the program coding.

(S4) encoding

Encodable immediate data, which has been judged as positive at S3, is encoded. In the above example, "80000000h" (=M) is encoded to be 31 (=N). Unencodable immediate data, which has been judged as negative at S3, is sent intact to S5.

(S5) conversion

The input program is converted into the format shown in FIG. 2. As far as an immediate instruction is concerned, encoded or not-encoded data thereof is stored in the immediate data field. Regarding encoded data, an indication, for example, as to whether it is necessary to execute a subtraction operation is also stored in the immediate data field. Such an indication may alternatively be stored in the type field. The selection of which field is used to store the indication depends on design policy.

When the program includes a bit manipulation operation, the operation is first of all replaced by a basic operation, such as "and", plus encoded data, and is converted into a machine language at S5.

What is claimed is:

1. A program execution apparatus, comprising:
    a fetch section for sequentially fetching instructions, including an immediate instruction;
    a decoding section for decoding fetched instructions;
    an execution section for executing decoded instructions, wherein said decoding section includes a judgement section for judging whether a fetched immediate instruction includes immediate data which has been encoded; and
    a data decoding section for decoding immediate data which has been encoded, wherein said data decoding section decodes encoded immediate data by expanding the encoded immediate data into a binary string according to a value of the encoded immediate data, wherein said value of the encoded immediate data is N, and wherein said data decoding section generates a binary string in which only an (N+1)th bit of the string is different from other bits thereof.

2. A program execution apparatus according to claim 1, wherein
    said judgement section judges whether the fetched immediate instruction includes immediate data which has been encoded by referring to a specific bit of the fetched immediate instruction.

3. A program execution apparatus according to claim 1, in which said immediate instruction includes a bit which indicates if a subtraction operation is necessary for contained immediate data, wherein
    said data decoding section refers to the bit and, when the bit indicates that the subtraction operation is necessary, subtracts one from data represented by said binary string, thereby generating another binary string.

4. A program execution apparatus according to claim 1, wherein said execution section possesses a "not" operation section for inverting all bits of said binary string.

5. A program execution apparatus according to claim 1, wherein said execution section includes:

an "and" operation section for computing an AND of data represented by said binary string and another operand data designated by the immediate instruction;

an "or" operation section for similarly computing an OR;

an "xor" operation section for similarly computing an exclusive OR; and a "mask" operation section for computing an AND of data represented by said binary string with all bits inverted and another operand data designated by the immediate instruction.

6. A program execution apparatus according to claim 1, wherein said data decoding section includes:
    a memory section for storing correspondence between immediate data before decoding and immediate data resulting from decoding; and
    a conversion section for converting data according to the correspondence stored in the memory section.

7. A program execution apparatus, comprising:
    a fetch section for sequentially fetching instructions, including an immediate instruction;
    a decoding section for decoding fetched instructions;
    an execution section for executing decoded instructions, wherein said decoding section includes a judgement section for judging whether a fetched immediate instruction includes immediate data which has been encoded; and
    a data decoding section for decoding immediate data which has been encoded, wherein encoded data N is expressed in a binary form in a 5-bit immediate data field, wherein the data decoding section decodes the encoded data N into decoded data M having 32 binary bits such that only an (N)th bit of the decoded data M is 1, and
    wherein the immediate data field has 5 bits, and wherein if the most significant bit (MSB) out the 5 bits is one (MSB=1), then the decoded data M is subjected to a subtraction operation.

8. A program execution apparatus, comprising:
    a fetch section for sequentially fetching instructions, including an immediate instruction;
    a decoding section for decoding fetched instructions; an execution section for executing decoded instructions, wherein said decoding section includes a judgement section for judging whether a fetched immediate instruction includes immediate data which has been encoded; and
    a data decoding section for decoding immediate data which has been encoded, wherein said data decoding section decodes encoded immediate data by expanding the encoded immediate data into a binary string according to a value of the encoded immediate data, wherein said value of the encoded immediate data is N, wherein said data decoding section generates a binary string in which only an (N+1)th bit of the string is different from other bits thereof, wherein said immediate instruction includes a bit which indicates if a subtraction operation is necessary for contained immediate data, and wherein said data decoding section refers to the bit and, when the bit indicates that the subtraction operation is necessary, subtracts one from data represented by said binary string, thereby generating another binary string.

* * * * *